United States Patent
Nelson et al.

(10) Patent No.: US 6,507,861 B1
(45) Date of Patent: Jan. 14, 2003

(54) SYSTEM AND METHOD FOR AVOIDING DEADLOCK IN A NON-PREEMPTIVE MULTI-THREADED APPLICATION RUNNING IN A NON-PREEMPTIVE MULTI-TASKING ENVIRONMENT

(75) Inventors: Ellen M. Nelson, Loveland, CO (US); Gary G. Kiwimagi, Fort Collins, CO (US)

(73) Assignee: Hewlett-Packard Company, Palo Alto, CA (US)

( * ) Notice: Subject to any disclaimer, the term of this patent is extended or adjusted under 35 U.S.C. 154(b) by 0 days.

(21) Appl. No.: 08/389,676

(22) Filed: Feb. 16, 1995

Related U.S. Application Data

(63) Continuation of application No. 08/025,007, filed on Mar. 2, 1993, now abandoned.

(51) Int. Cl.[7] .................................................. G06F 9/50
(52) U.S. Cl. ........................................ 709/104; 709/107
(58) Field of Search ................................. 709/104, 107

(56) References Cited

U.S. PATENT DOCUMENTS 5,301,326 A  *  4/1994  Linnett et al. .............. 395/700

OTHER PUBLICATIONS

Petzold, Charles Why You Need to Multitast in the OS/2 Presentation Manager, PC Magazine V9 N9 p293(4), May 1990.*

Adler, Marc, Learning Windows Part 1; The Message–Based Paradigm Microsoft Systems Journal, Jul. 1990 V5 N4 p 85(7).*

Woehr, Jack J., A Medium–Heavyweight Forth Multitasker, Dr. Dobb's Journal, Jun. 1991 V16 N 6 p 66(8).*

PC Magazine, May 15, 1990, pp. 293–299, C. Petzold, "Why you need to multitask in the OS/2 presentation manager".

1992, Microsoft Press, Redmond, USA, p. 22.3, "Microsoft Windows 3.1 Guide To Programming".

Journal of Parallel and Distributed Computing, vol. 11,No. 3, Mar. 1991, pp. 188–197, Y. Wei, et al., "The design of a stub generator for heterogeneous RPC systems".

Potter, David, Designing a Real–Time Debugger; The Best of Both Worlds, Dr. Dobb's Journal Nov 1992 V17 N 11 p 70(7).*

Pietrek, Matt, Writing a Windows Debugger, Windows–DOS Developer's Journal Jun. 1992 V3 N 6 p6(7).*

* cited by examiner

Primary Examiner—St. John Courtenay, III

(57) ABSTRACT

A system and method for avoiding deadlock in a non-preemptive multi-tasking application program, wherein the application program operates in an operating system that provides a non-preemptive multi-tasking environment. All components of the application program that require resources from other components within the application program, and that will not yield to internal timeslicing within the application program, are placed in separate executables (i.e., application programs). Thus allowing maximum background processing and the avoidance of deadlock.

7 Claims, 4 Drawing Sheets

SYSTEM AND METHOD FOR AVOIDING DEADLOCK IN A NON-PREEMPTIVE MULTI-THREADED APPLICATION RUNNING IN A NON-PREEMPTIVE MULTI-TASKING ENVIRONMENT

CROSS REFERENCE TO RELATED APPLICATION(S)

This is a continuation of copending application Ser. No. 08/025,007 filed on Mar. 2, 1993, now abandoned.

BACKGROUND OF THE INVENTION

1. Field of the Invention

The present invention generally relates to the avoidance of deadlock in a multi-tasking environment and, more particularly, to a system and method for using interprocess communication to maximize background processing and avoid deadlock in a multi-threaded application running in a non-preemptive multi-tasking environment.

2. Discussion of Related Art

Computer application programs that utilize a "windows" environment are prevalent in today's market place. The use of windows allows a user to work in a multi-tasking environment in which several application programs may compete for a finite number of resources. Operating in a multi-tasking environment can create a number of problems, however.

For example, if an application program requests a resource, and if the resource is not available at that time, the application program enters a wait state. It may happen that the waiting application program will never again change state, because the resource it has requested is held by another waiting processes. This situation is called deadlock. To prevent deadlock, or recover from one if it occurs, the system may take some relatively extreme action, such as preemption of resources from one or more of the deadlocked application programs.

A set of processes is in a deadlock state when two or more processes in the set is waiting for an event that can only be caused by another process in the set. A deadlock situation can arise if and only if the following four conditions hold simultaneously in the system.

Mutual Exclusion. At least one resource is held in a nonshareable mode; that is, only one process at a time can use the resource. If another process requests that resource, the requesting process must be delayed until the resource has been released.

Hold and Wait. There must exist a process that is holding at least one resource and is waiting to acquire additional resources that are currently being held by other processes.

No Preemption. Resources cannot be preempted. That is, a resource can only be released voluntarily by the process holding it, after the process has completed its task.

Cirular Weight. There must exist a set $(p_0, p_1, \ldots, p_n)$ of waiting processes such that $p_0$ is waiting for a resource which is held by $p_1$, $p_1$ is waiting for a resource which is held by $p_2, \ldots, p_{n-1}$ is waiting for a resource which is held by $p_n$ and $p_n$ is waiting for a resource which is held by $p_0$.

All four conditions must hold for a deadlock to occur. By insuring that at least one of these conditions cannot hold, the occurrence of a deadlock can be prevented. For a more detailed description of the deadlock problem see Peterson J. and Siberschatz A., Operating System Concepts, Addison-Wesley Publishing Co., Inc. (1986).

In a windows environment, any application which consists of more than one component which voluntarily shares control of the processor risks starvation of all other components when any component has control of the processor. This situation results in poor background-processing performance in general, and can degenerate into deadlock when the component which has control requires input from another component. Deadlock occurs because the starved component is unable to run and provide the input, because the component which has control will not release until it receives this input from the starved component.

Microsoft® Windows provides a non-preemptive multi-tasking environment for running application programs. This means that several applications can share the processor in a sequential manner provided that each application is "well-behaved" and voluntarily gives up the processor periodically. The Microsoft® Windows operating system, for example, has no mechanism to detect or remedy deadlock or starvation situations that may arise if an application program is not well-behaved.

FIG. 1 is a conceptual representation of several application programs running in a Windows operating system (OS) 110. The Windows operating system is a multi-tasking operating system. Multi-tasking means that more than one application program can run at a time. Non-preemptive means that once an application program, for example, application program A 120 is granted access by the Windows operating system 110 to the processor (not shown) it cannot be preempted by application programs B 130, C 140, or D 150. Thus, while application program A 120 is running, all other application programs 130, 140, 150 are starved. Accepted Windows programming practices dictate that application programs 120–150 voluntarily give up access to the processor (i.e., the application program is well behaved). Thus, each application program receives a timeslice of time with the processor. A timeslice is a unit of time an operating system allows an application program to run. In a non-preemptive system, a timeslice has no pre-defined limit.

Once an application program 120–150 releases control of the processor, the Windows operating system 110 can then grant (schedule) another application program 120–150 access to the processor.

Some application programs provide their own internal non-preemptive multi-tasking through separate tasks, or threads within the application program. Note that a multi-tasker within an application program is similar to the multi-tasker found in the Windows operating system 110. For example, one thread is responsible for accessing data on the disk, while another thread accesses data from the tape, and another thread interacts with the user to determine what operations to perform. The goal of this design is to provide quicker responses to user requests because the data is immediately available through "background" processing.

Threads have control of the processor during their timeslice, and communicate with other threads via message passing. This timeslicing between threads, and message passing between threads takes place within one application program 120–150, during one Window operating system 110 timeslice.

The Windows operating system 110 provides application programs 120–150 with an interface to standard methods for communicating with the user, for example: dialog boxes, list boxes, scrollbars, edit controls, cursors, icons, etc. The user interface thread of an application program uses dialog boxes to obtain different types of information from the user. Dialog boxes as provided by the Windows application interface contain their own Windows message loop. A dialog box put up by an application program 120–150 is well-behaved, and yields to Windows software 110 allowing other application programs 120–150 to run. However, the message loop within the application program's dialog box receives all the Window software 110 messages for that particular application program. Thus, if the user interface thread of an application program places a dialog box on the screen, that dialog box will receive all messages for the application program, and no other threads within the application program are able to run until the dialog box is removed. This leads to starvation of other threads in the application program. No background processing is done by other threads in the application program while a dialog box has control, which can lead to deadlock.

For example, if the user wishes to print the contents of a tape directory, the user manager thread puts up a dialog box to allow the user to choose what to print, and to control the printing process. Once the user selects which directory to print, the user manager thread sends a request for each item in the directory to the tape manager thread. The tape manager thread would then return the name of each file to be printed. Due to the nature of a dialog box, the other threads within the application program will not run until the dialog box is removed. Thus, the tape manager thread will not receive a timeslice. With no timeslice, the tape manager thread cannot perform any background processing (such as reading the list of files from the tape). Since the dialog box requires information from the tape manager thread in order to complete it's job, and the tape manager thread is never able to run because the dialog box has control of the application, deadlock occurs.

Thus, what is needed is a system and method for avoiding deadlock in a non-preemptive multi-tasking application program which is running in a non-preemptive multi-tasking operating system.

SUMMARY OF THE INVENTION

The present invention provides a system and method of avoiding deadlock in application programs that multi-task within themselves in a non-preemptive manner. The application programs operate in an operating system that also provides a non-preemptive multi-tasking environment. All components of the application program which will not yield to internal timeslicing until all their resource needs are met, must be isolated into separate executables (i.e., separate application programs). Isolating the components into a separate executables allows maximum background processing performance and deadlock avoidance. Internal timeslicing for these components is replaced with external, operating system timeslicing which insures that all other components within the application program can have an opportunity to execute their assignments.

In particular, a protocol is defined for communicating between executables that does not cause one executable to directly or indirectly execute a function in another executable. The component that will not release to internal timeslicing is placed into its own executable. All other components and a stub of the offending component are placed into another executable (the main executable). A communication link between the two executables is then established. Each time the main executable determines that it is the offending components turn to run it calls the stub for the offending component. The stub is responsible for receiving and forwarding messages between the main executable and the offending component which is now in its own separate executable.

Since the offending component and the rest of the system are multi-tasked by the operating system, deadlock is avoided because the operating system will periodically give the main executable permission to run. The main executable can then generate and deliver the input that is required by the offending component and satisfy the offending components resource needs.

BRIEF DESCRIPTION OF THE DRAWINGS

The above and further advantages of this invention may be better understood by referring to the following description taken in conjunction with the accompanying drawings, in which.

DETAILED DESCRIPTION OF THE PRESENT INVENTION

Figure 1:
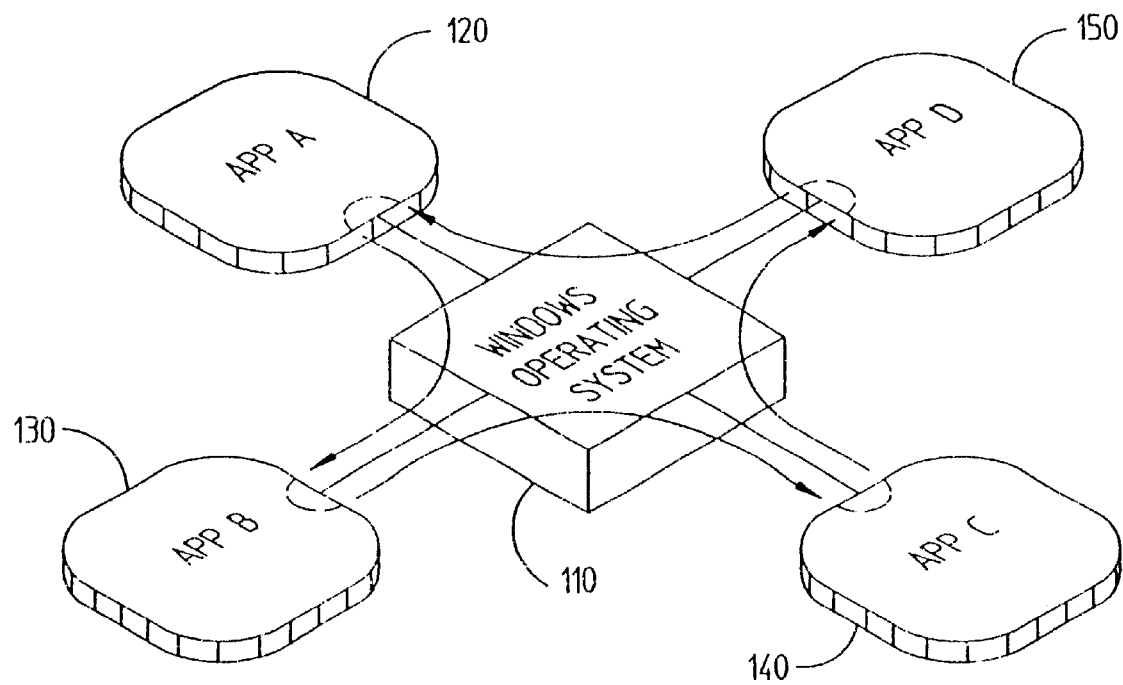
FIG. 1 shows a high level diagram of an multi-tasking environment for a windows operating system.
Figure 2:
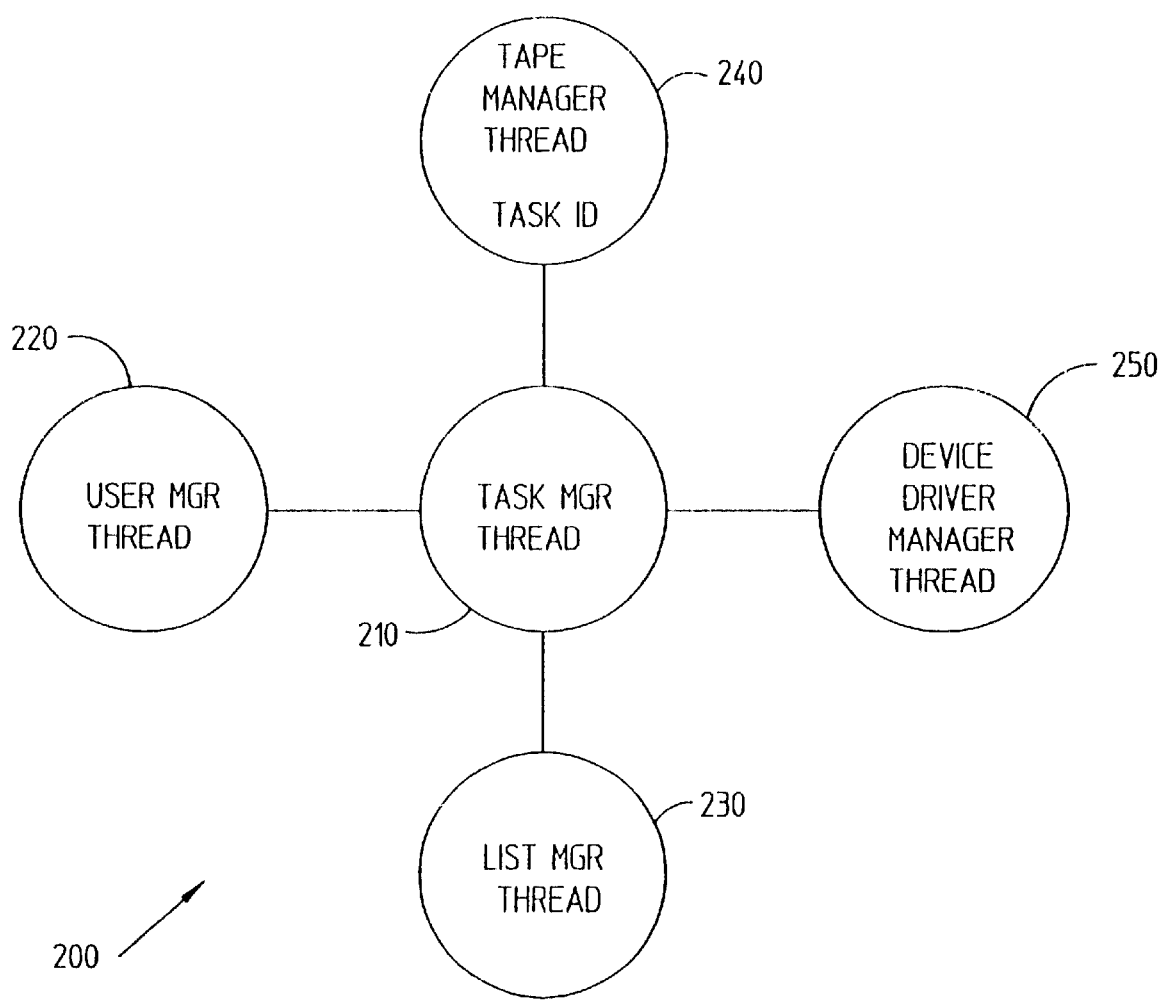
FIG. 2 shows an example of non-preemptive multi-tasking within a single application program.

FIG. 2 shows an example of a non-preemptive multi-tasking application program 200. The application program 200 includes a task manager 210, a user interface manager thread 220, a list manager thread 230, tape manager thread 240, and device driver manager thread 250. Note that these are only exemplary threads, and other threads can be substituted or added as needed.

Figure 3:
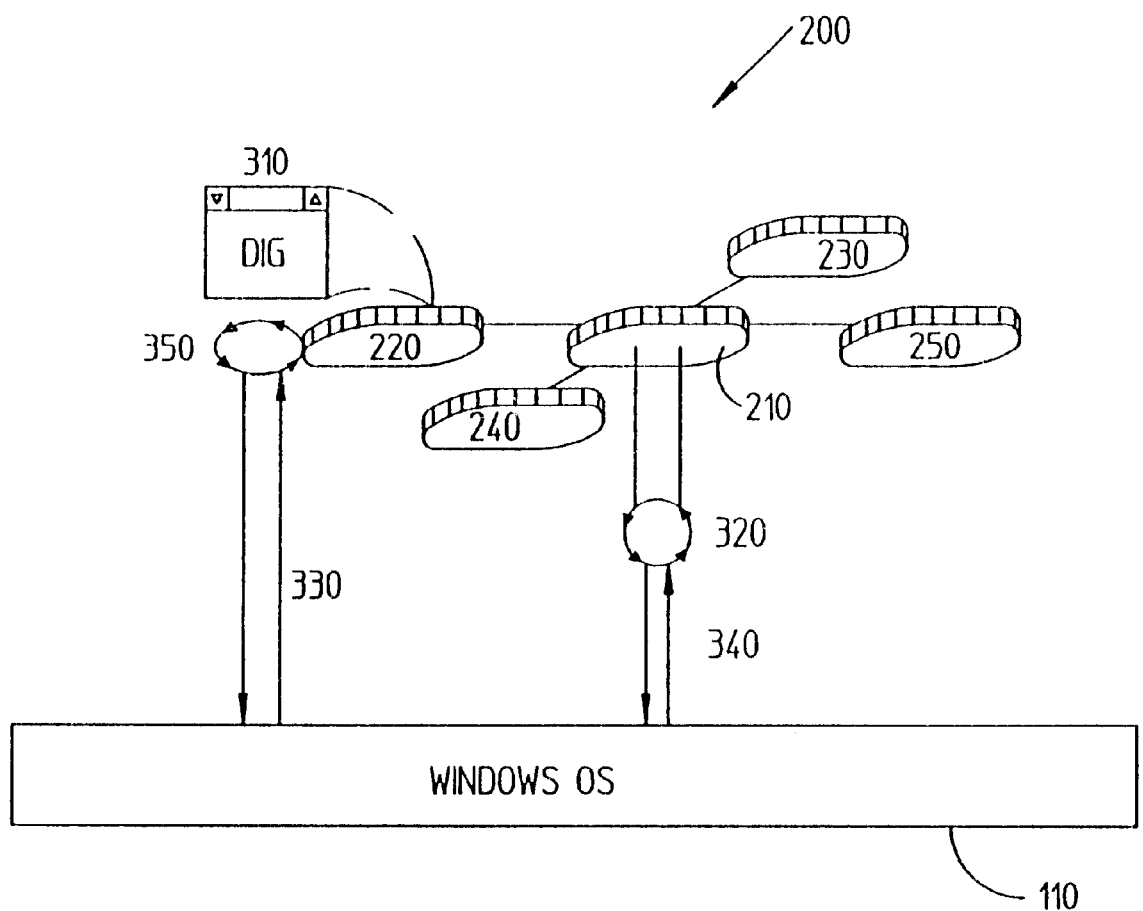
FIG. 3 illustrates the non-preemptive multi-tasking application program shown in FIG. 2 coupled to the windows operating system.

FIG. 3 shows a more detailed view of the non-preemptive multi-tasking application program 200. Once application program 200 obtains permission to run from Windows operating system 110, the task manager 210 inside application program 200 takes control. The task manager 210 grants permission to the user interface thread 220 to run. The user interface thread 220 puts up a dialog box 310. The dialog box 310 might request services from another task 230, 240, and 250. The user interface thread 220 (via dialog box 310) waits for a response from the other task before removing the dialog box 310. However, the other task never responds because the task manager 210 never gives it permission to run because the task manager 210 is waiting for the user interface thread 220 to give up its timeslice. The user interface thread 220 will never give up its timeslice since the dialog box 310 will not be removed until it receives a response to its request. The result is deadlock.

As shown in FIG. 3, the user interface thread 210 does voluntarily yield to the windows timeslicing mechanism via link 330 (and associated message loop 350). However, it does not relinquish its timeslice via link 340 (and associated message loop 320), which would allow the task manager 210 to regain control of internal timeslicing scheduling.

In other words, since the application is non-preemptive and it has a component that is currently executing, no other components of the application can be started until the applications task manager receives control back from the component that is currently executing. Since that component will not stop executing until it receives input from some other component, the application program 200 is deadlocked.

A general solution to resource contention is to isolate the demands for resources in a single component. If information from another thread is viewed as a resource, then the dialog box in the user interface thread 310 may require several resources at one time (e.g., the processor and information from another thread).

To solve the deadlock problem, the offending component, in this case the user interface thread 220, must be placed in a separate executable (i.e., a separate application program), allowing the rest of the system (containing all other threads) to receive control from the Windows operating system 110 when the offending component does not to yield to the internal timeslicing mechanism. The application program 200 according to this solution comprises two separate executables which each receive operating system (Windows) timeslices, alleviating the potential for starvation and deadlock within a single application program. According to this solution, however, a method of interprocess communication is required to send information between the two executables.

Figure 4:
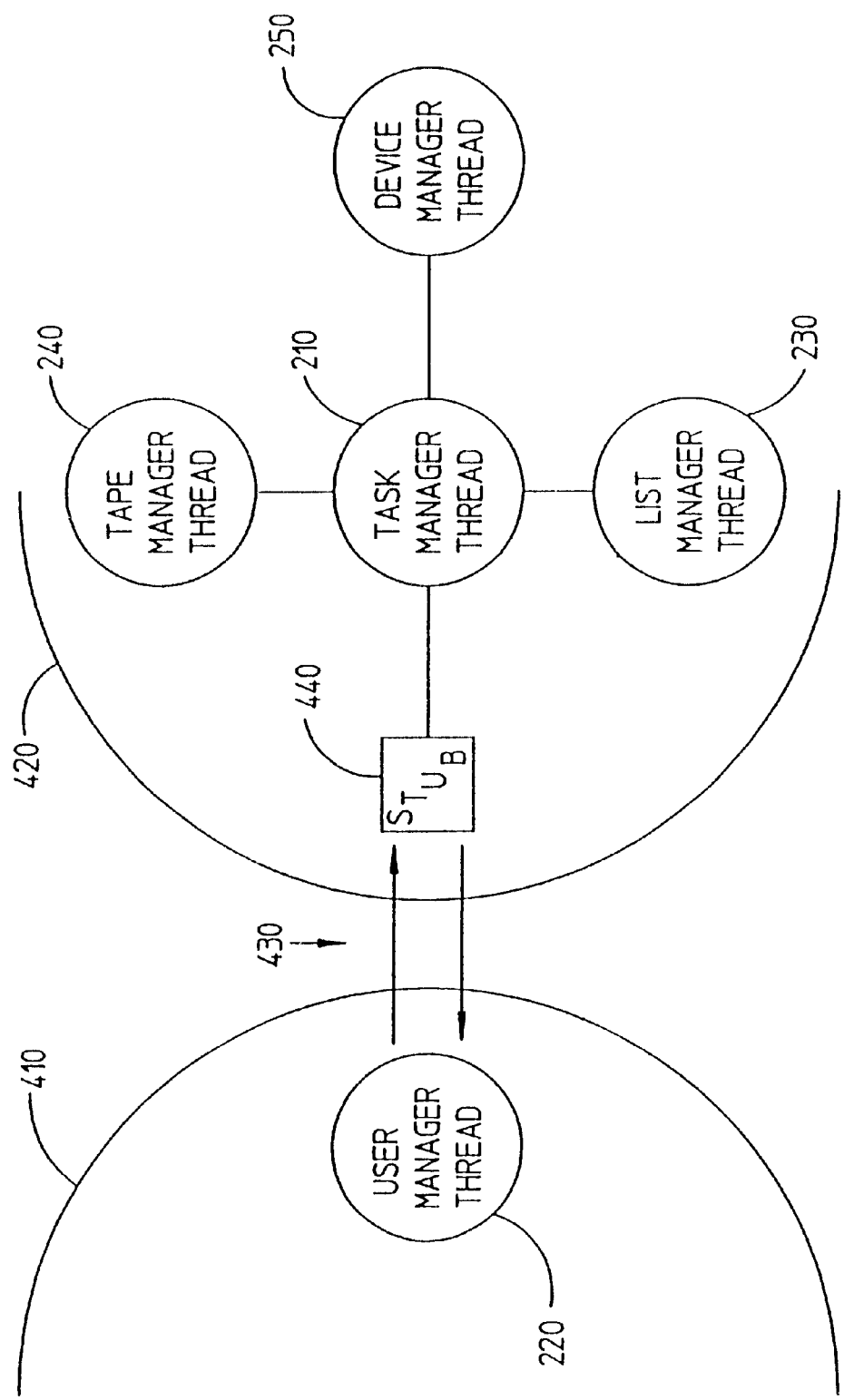
FIG. 4 illustrates the solution to the deadlock problem associated with an application program that multi-tasks within itself in a non-preemptive way.

The dialog box-induced starvation (and the deadlock problem in the Windows operating system) can be avoided by recognizing that dialog boxes yield to the Windows operating system 110 and allow other application programs to run. Referring to FIG. 4, breaking the application program 200 into two pieces, (1) a user interface executable, which consists of the user interface thread 220, and (2) the rest of the system, which consists of all other threads, eliminates the potential starvation of the other threads. The user interface thread 220 is no longer required to yield to an internal timeslicing mechanism to permit the rest of the system to receive regular external Windows timeslices. Accordingly, background processing can occur even in the presence of a dialog box.

In a preferred embodiment, interprocess (i.e., between application programs) communication is accomplished using Windows Dynamic Data Exchange (DDE) protocol, which is supported by Microsoft' Windows 3.x operating systems. The DDE protocol is used to communicate between the two executables. The DDE protocol also enables an application program to place data in a shared memory location, and then signal another application program that data is available. For a more detailed description of the DDE protocol see *Microsoft Windows* 3.1 *Guide to Programming*, programmers reference library, Microsoft Press, Chapter 22, 1987–1992.

FIG. 4 illustrates the present invention. That is, the user interface thread 220 is placed in it. own application program 410. All other threads 220–250 are placed in their own application program 420. A DDE link 430 connects the two application programs 410 and 420. Application program 420 further includes a user interface stub 440. The user interface stub is a piece of software that "looks" like the user interface thread 220 to the application program 420, but is only responsible for receiving and forwarding messages between the user interface thread 220 in the now separate application program 410 and the task manager 210.

The previous deadlock-inducing scenario now works as follows. The user wishes to print the contents of a directory on tape. The separate user interface application 410 puts up a dialog box to allow the user to choose what to print, and to control the printing process. Once the user selects which directory to print, the dialog box sends a request for each item in the directory to the tape manager thread 240 in the rest of the system's separate application program 420 using the DDE protocol and communication link 430. The dialog box 310 yields to the Windows operating system 110, and the rest of the system's application programs get control from the Windows operating system 110. The tape manager thread 240 receives the message from the user manager stub 440, and returns the name of a file to be printed.

The rest of the system's application programs eventually yields to the Windows operating system 110, and the user interface application 410 eventually regains control from the Windows operating system 110. The user interface application 410 retrieves the message from the tape manager via the DDE link 430, and sends the name of the file to be printed to the printer (not shown). The cycle repeats until all requested file names have been printed. Deadlock has been avoided.

The problem with deadlocks is not unique to the Windows environment. As such, the present invention should not be limited to window based applications. For example, any operating system environment which operates in a non-preemptive multi-tasking manner can benefit from the teachings of present invention.

While the invention has been particularly shown and described with reference to preferred embodiments thereof, it will be understood by those skilled in the art that various changes in form and details may be made therein without departing from the spirit and scope of the invention.

What is claimed is:

1. A method for avoiding deadlock in a non-preemptive multi-tasking application program, wherein the application program operates in an operating system that is also non-preemptive and multi-tasking, wherein deadlock occurs when a first component within the application program will not yield to internal timeslicing before receiving a requested resource from a second component within the application program, the method comprising:

(1) placing a component of a main application program that requires resources from other components within said main application program, and that will not yield to internal timeslicing within said main application program, in a separate application program; and (2) connecting said separate application program to said main application program via a communication link, wherein said separate application program and said main application program exchange data;

wherein said main application program and said separate application program are well behaved, and wherein said separate application program yields to an external operating system timeslicing mechanism thereby insuring that all components of said main application program have an opportunity to execute their assignments.

2. A computer-based system that avoids deadlock in a non-preemptive multi-tasking application program running in an operating system that is also non-preemptive and multi-tasking, the computer-based system comprising:

(a) a first application program having a plurality of components, wherein each of said plurality of components do not require resources from one another, or each of said plurality of components require resources from one another but yield to internal timeslicing within said first application program;

(b) a second application program having at least one component that requires resources from one of said plurality of components within said first application;

(c) a communication link connecting said first application program and said second application program together, wherein said first application program and said second application program communicate with one another across said communication link;

wherein said first application program and said second application program are well behaved, and wherein said second application program yields to an external operating system timeslicing mechanism thereby insuring that all components of said first and second application programs have an opportunity to execute their assignments.

3. The system of claim 2, wherein said communication link includes shared memory and signal means for signaling another application program when data has been transferred to said shared memory.

4. The system of claim 2, wherein said first application program further includes an interface stub responsible for receiving and forwarding messages between said first application program and said second application program.

5. The system of claim 2, wherein the operating system is a non-preemptive multi-tasking windows operating system.

6. A method for avoiding deadlock associated with a non-preemptive multi-tasking application program operating in an non-preemptive multi-tasking operating system, the method comprising:

(1) executing a first application program within the operating system environment, wherein said first application program only includes components that do not require resources from one another, or components that require resources from one another but yield to internal timeslicing within said first application program;

(2) executing a second application program within said operating system environment, wherein said second application program includes components that require resources from at least one component within said first application program, wherein said second application program is activated or deactivated via an external operating system timeslicing mechanism; and (3) communicating between said first application program and said second application program, wherein said second application program yields to said external operating system timeslicing mechanism thereby insuring that all components of said first and second application programs have an opportunity to execute their assignments.

7. A method for avoiding deadlock associated with a non-preemptive multi-tasking application program operating in an non-preemptive multi-tasking operating system, the method comprising the steps of:

(1) identifying the components in the non-preemptive multi-tasking application program that require resources from other components within the non-preemptive multi-tasking application program;

(2) placing a first set of components within a first application program, said first set of components including the components that do not require resources from other components within the non-preemptive multi-tasking application program, or components that require resources from other components but yield to internal timeslicing within said first application program, wherein the internal timeslicing of said first set of components is replaced by an external operating system timeslicing mechanism;

(3) placing a second set of components within a second application program, said second set of components requiring resources from at least one component within said first set of components in said first application program, wherein said second application program is activated or deactivated via said external operating system timeslicing mechanism; and (4) placing a stub in said first application program, said stub receiving and forwarding messages between said first application program and said second application program, wherein said second application program yields to said external operating system timeslicing mechanism thereby insuring that all components of said first and second application programs have an opportunity to execute their assignments.

* * * * *